April 19, 1927. 1,625,091
J. F. PETERS
CAN BODY MAKING MACHINE
Filed Nov. 10, 1922 12 Sheets-Sheet 4

Inventor:
John Frederick Peters
By Munday, Clarke & Carpenter
Attys.

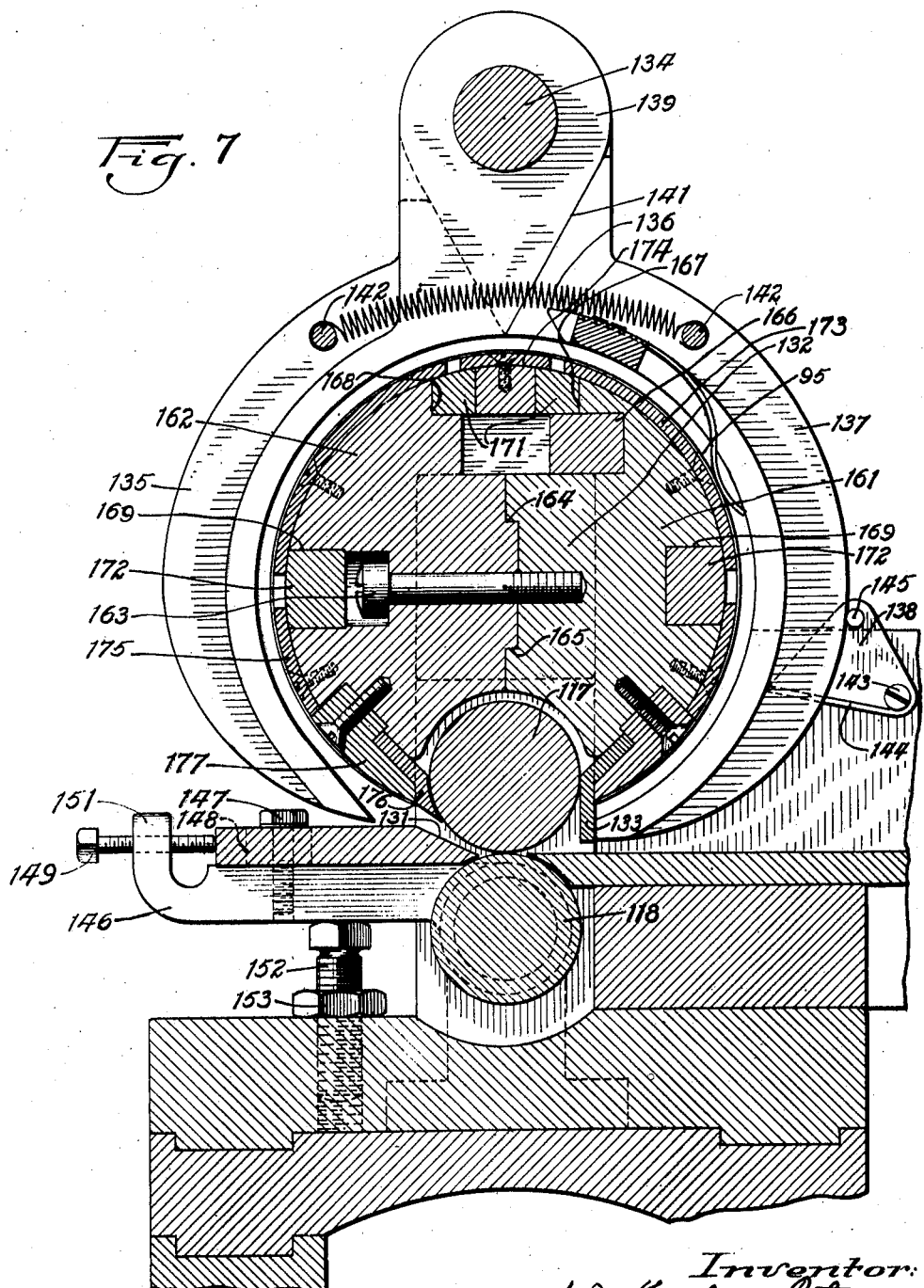

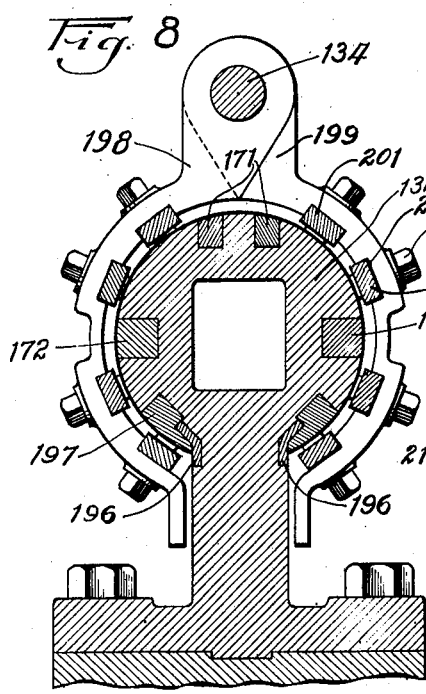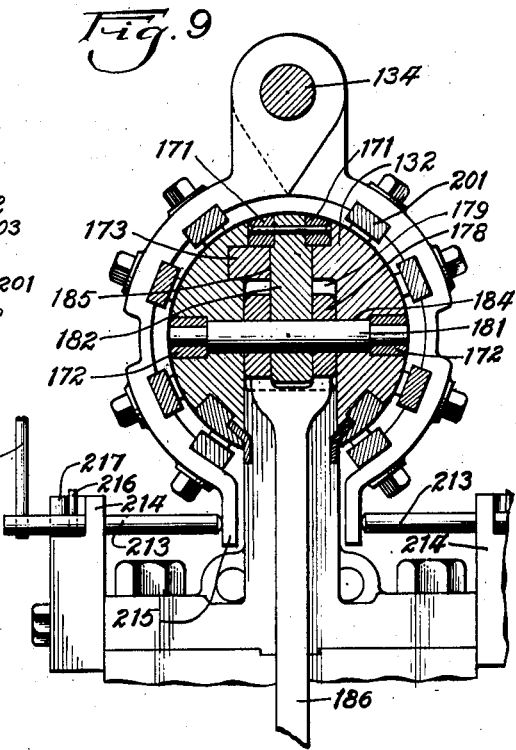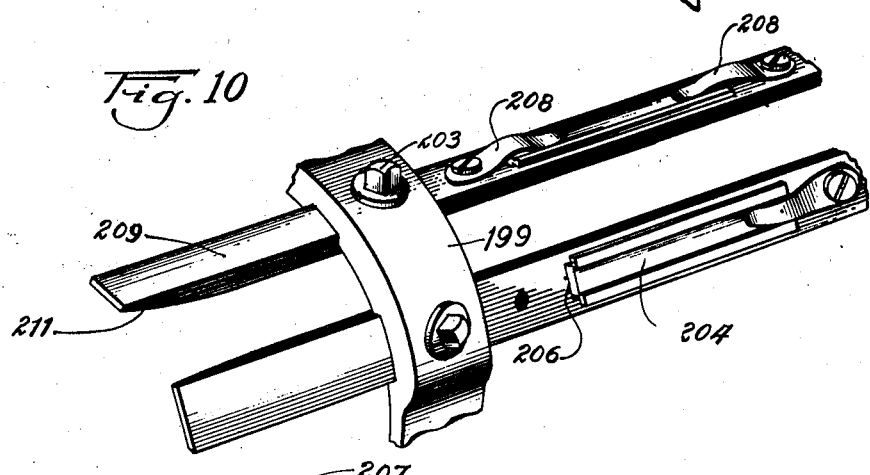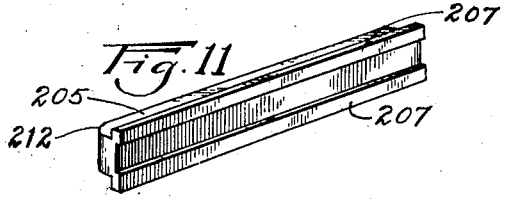

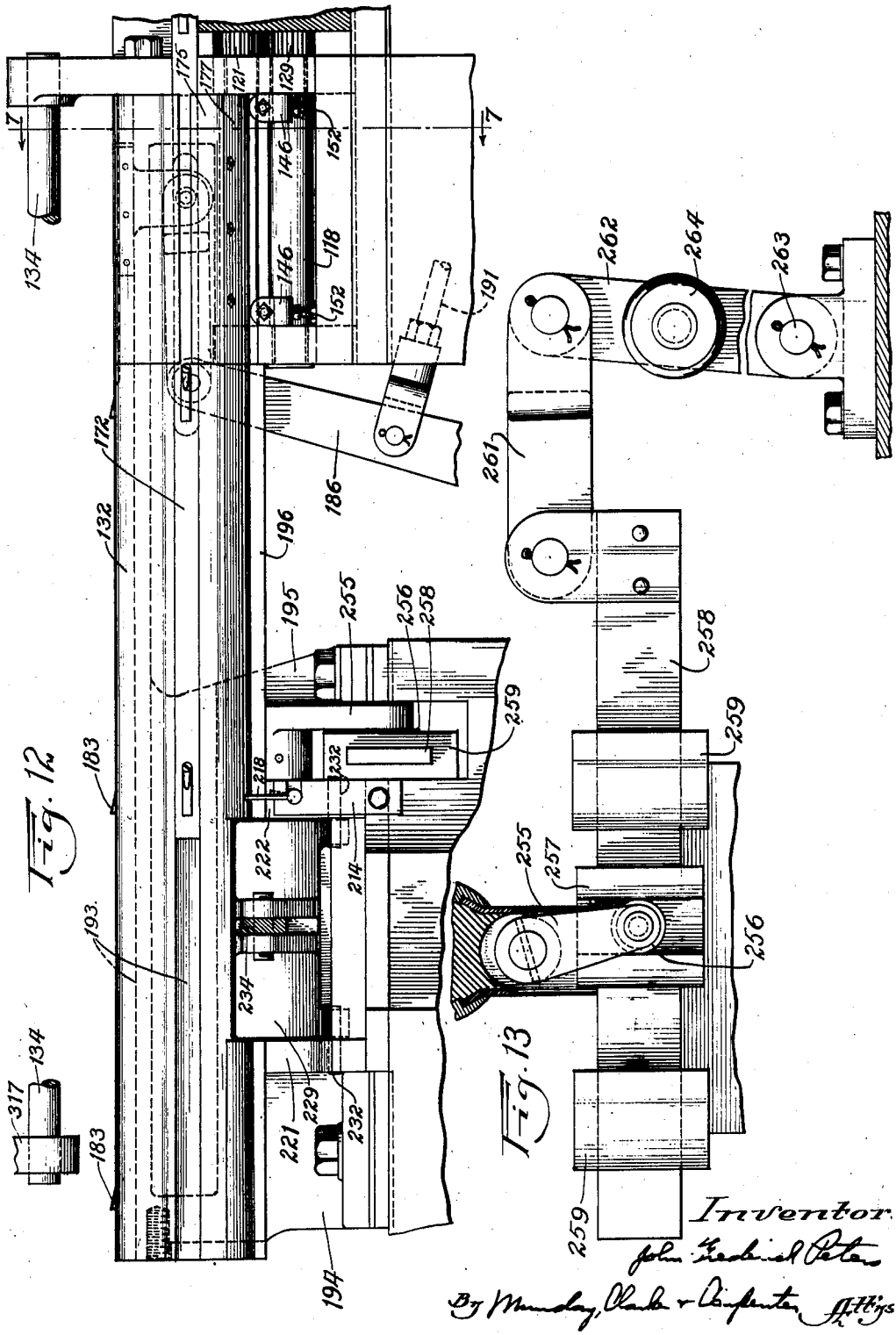

Fig. 14

April 19, 1927. 1,625,091
J. F. PETERS
CAN BODY MAKING MACHINE
Filed Nov. 10, 1922   12 Sheets-Sheet 9
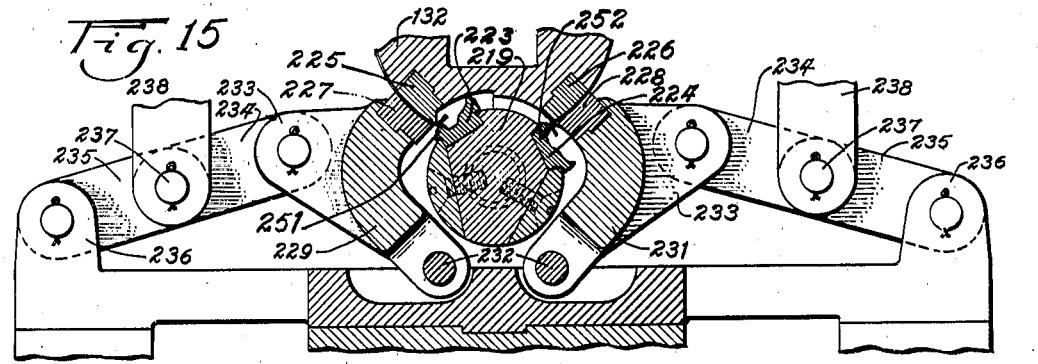
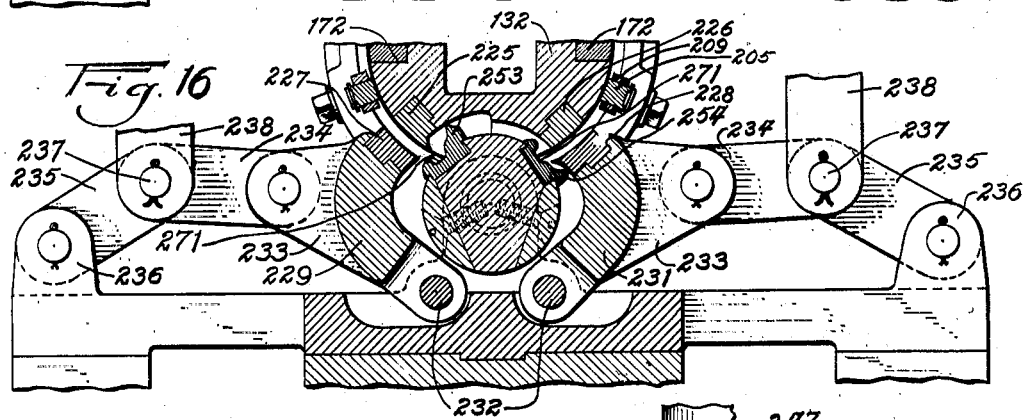
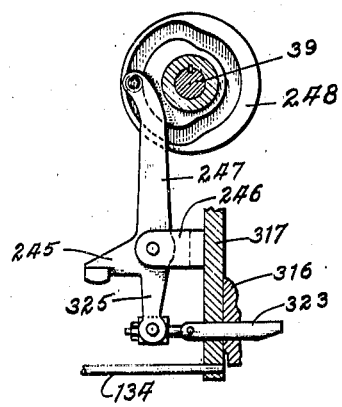
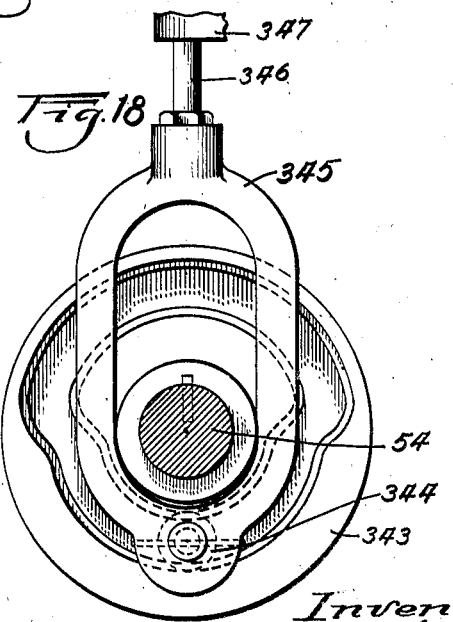
Inventor
John Frederick Peters
By: Munday, Clarke & Carpenter
Attys.

April 19, 1927.  J. F. PETERS  1,625,091
CAN BODY MAKING MACHINE
Filed Nov. 10, 1922   12 Sheets-Sheet 10

Inventor:
John Frederick Peters

April 19, 1927.  1,625,091

J. F. PETERS

CAN BODY MAKING MACHINE

Filed Nov. 10, 1922    12 Sheets-Sheet 11

Inventor
John Frederick Peters
By Munday, Clarke & Carpenter Attys.

April 19, 1927.  1,625,091
J. F. PETERS
CAN BODY MAKING MACHINE
Filed Nov. 10, 1922    12 Sheets-Sheet 12
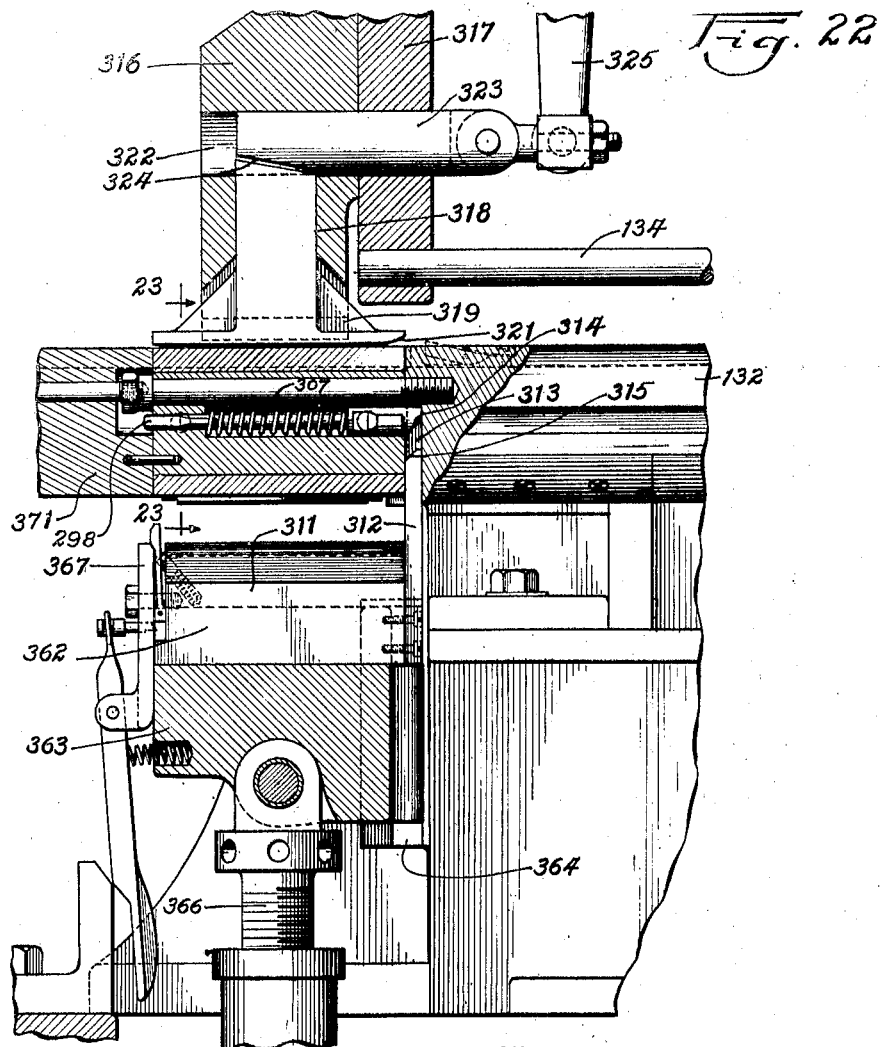
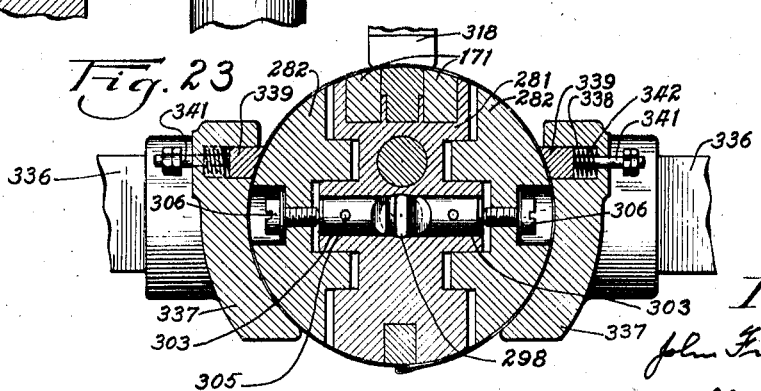
Inventor:
John Frederick Peters
By Munday, Clarke, Anfenfer Attys Patented Apr. 19, 1927

1,625,091

UNITED STATES PATENT OFFICE.

JOHN F. PETERS, OF ROCHESTER, NEW YORK, ASSIGNOR TO AMERICAN CAN COMPANY, OF NEW YORK, N. Y., A CORPORATION OF NEW JERSEY.

CAN-BODY-MAKING MACHINE.

Application filed November 10, 1922. Serial No. 599,991.

This invention relates to can body making machines and, while from certain aspects it relates more particularly to machines of the character of my co-pending application No. 559,135, filed May 8th, 1922, and of which this present application is in part a continuation, it will be readily manifest that, from certain other aspects, the invention is of wider and more general application. In my earlier application above referred to, the can body blank is automatically positioned about a horn by progressively bending it thereabout. This operation produces a body of even, smooth curvature, and this principle is employed in the apparatus herein selected for the purpose of illustrating the prefered embodiment of the invention.

The principal object of the present invention is to provide an apparatus involving this principle which will be of high efficiency, high speed, of certain full automatic action and particularly as regards the automatic feed of the blanks from a stack to the body forming horn.

Numerous other objects and advantages of the invention will be apparent as it is better understood from the following description, which, taken in connection with the accompanying drawings, illustrates a prefered embodiment thereof.

Referring to the drawings,

Fig. 7 is an enlarged section taken vertically at the blank bending station;

Figure 2:
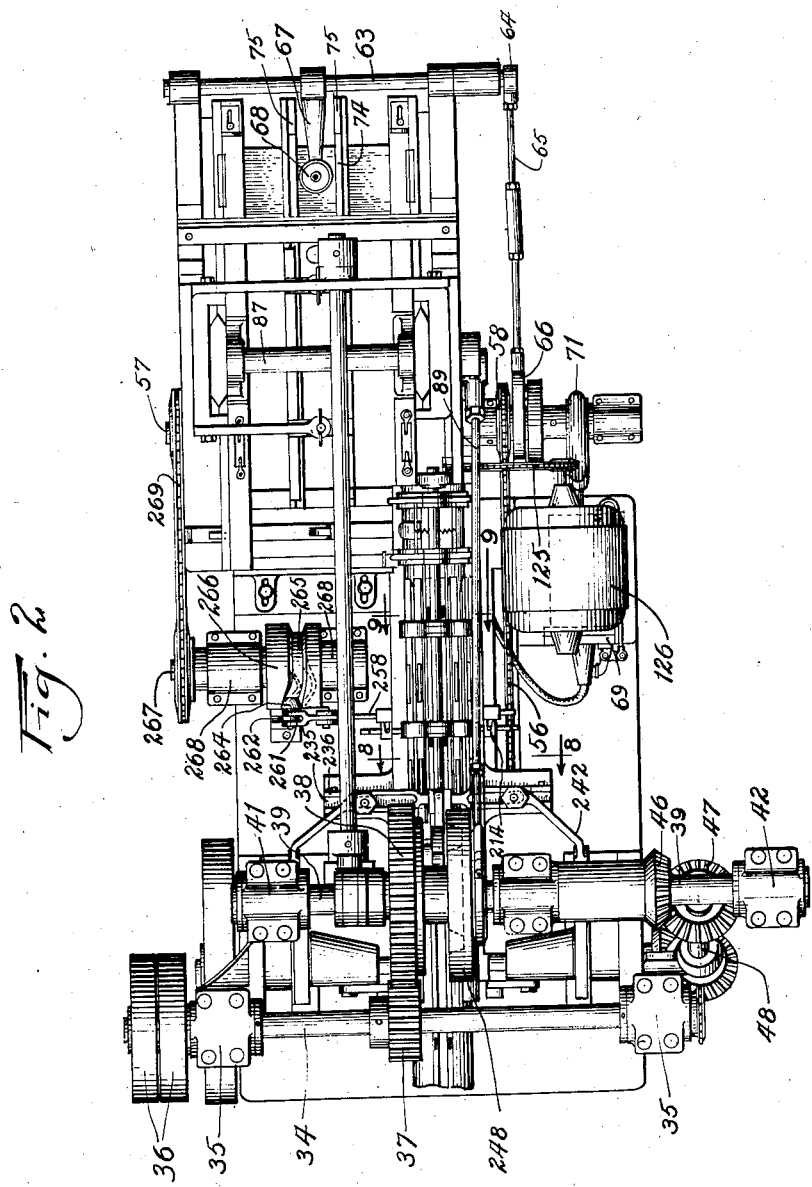
Fig. 2 is a top plan view thereof.
Figure 19:
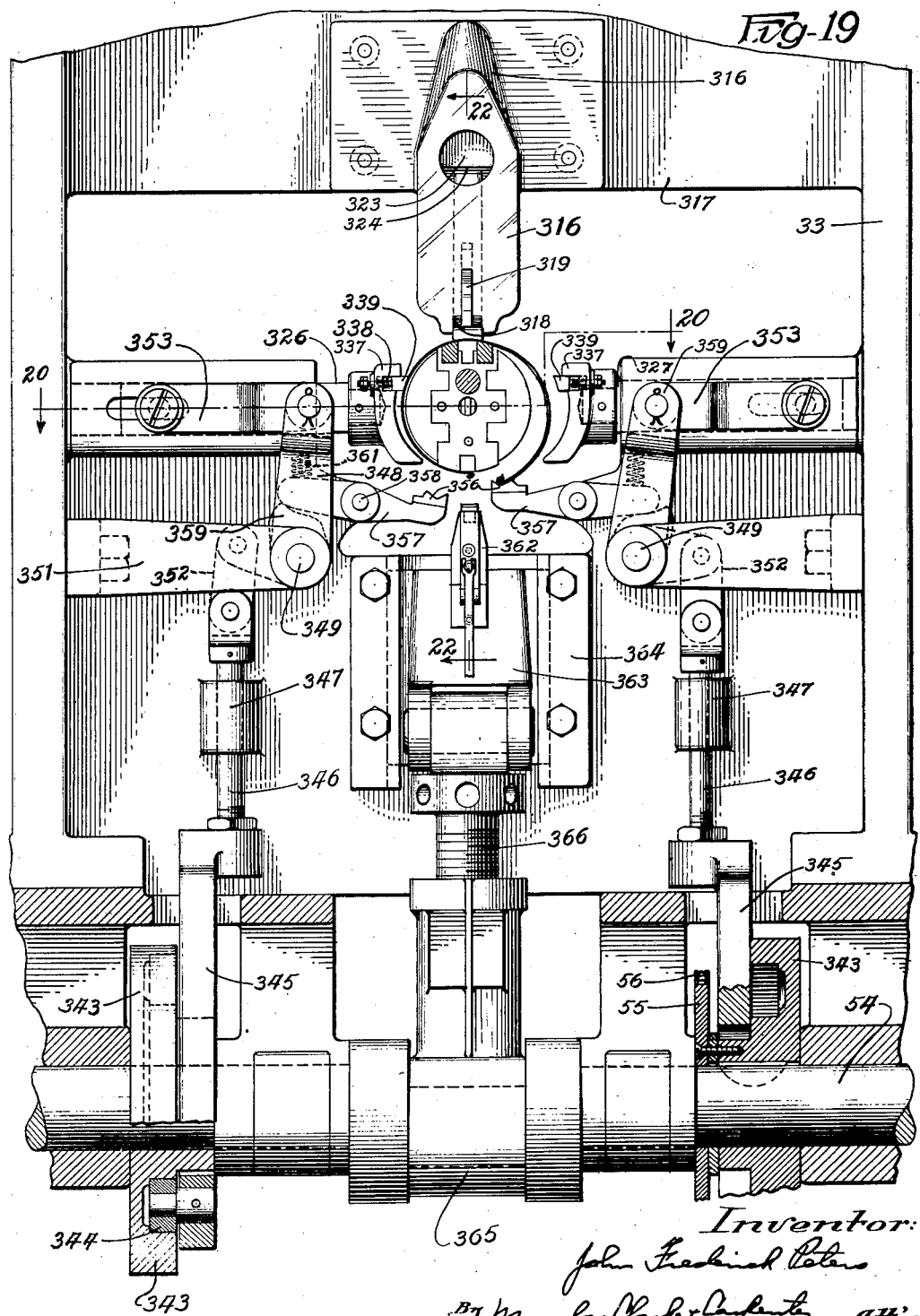
Figure 20:
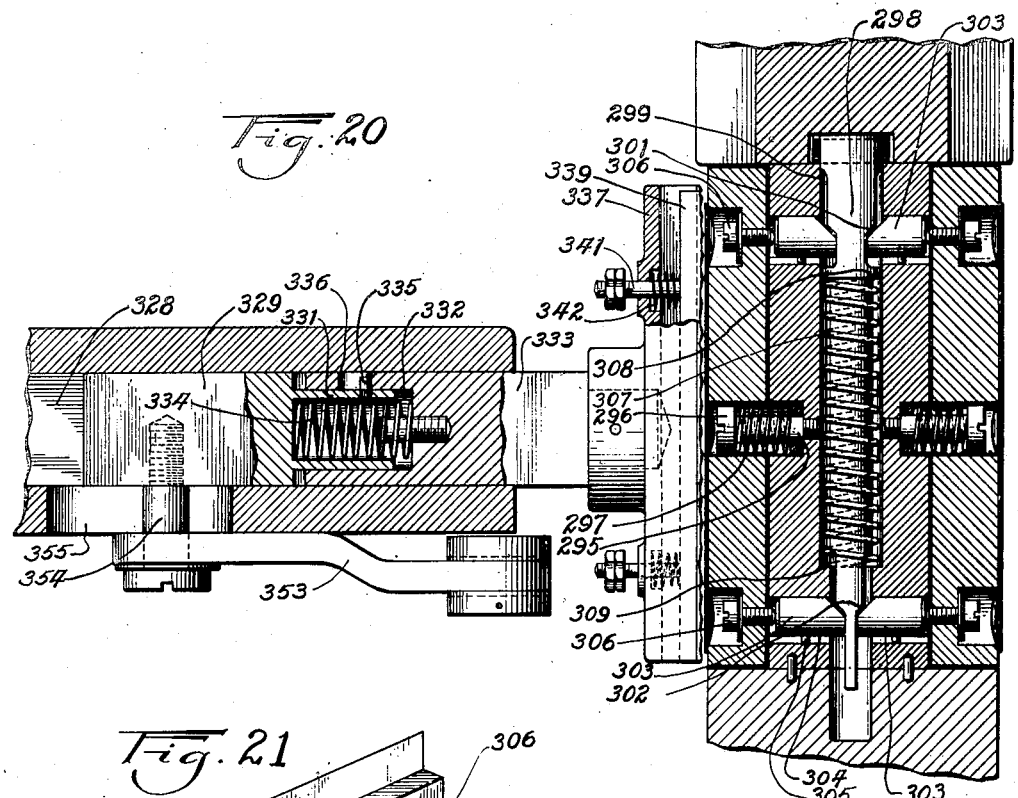
Figure 21:
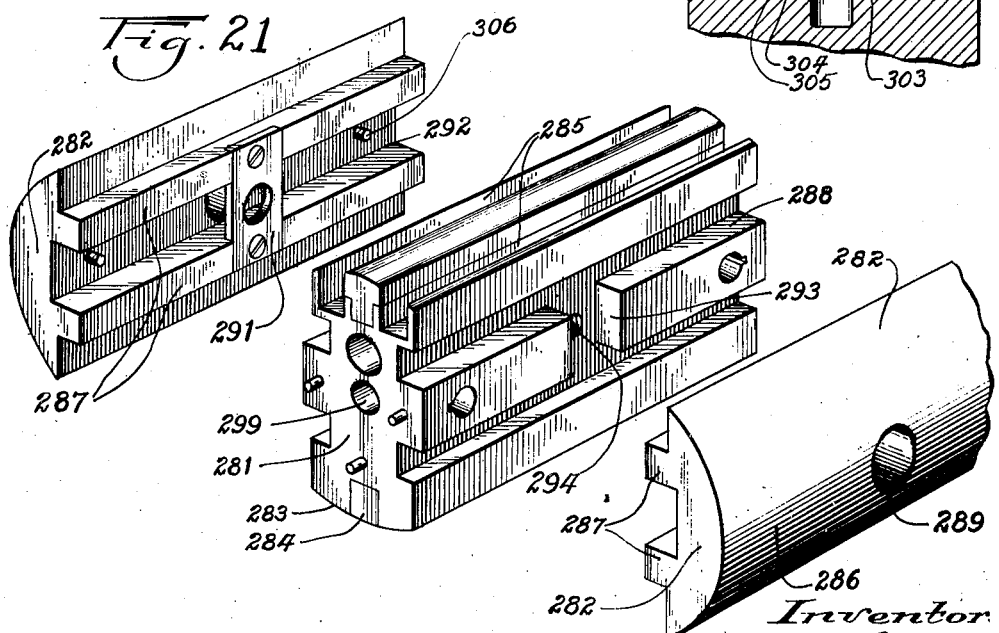

Figs. 8 and 9 are sections through the horn and taken on the lines 8—8 and 9—9 of Fig. 2;

Fig. 10 is a detail of the outside horn;

Fig. 11 is a similar view of one of the outside horn presser blocks;

Fig. 12 is a side elevation of the inside horn, parts being shown in section;

Fig. 13 is a side elevation of the mechanism for edging the blank;

Figure 14:
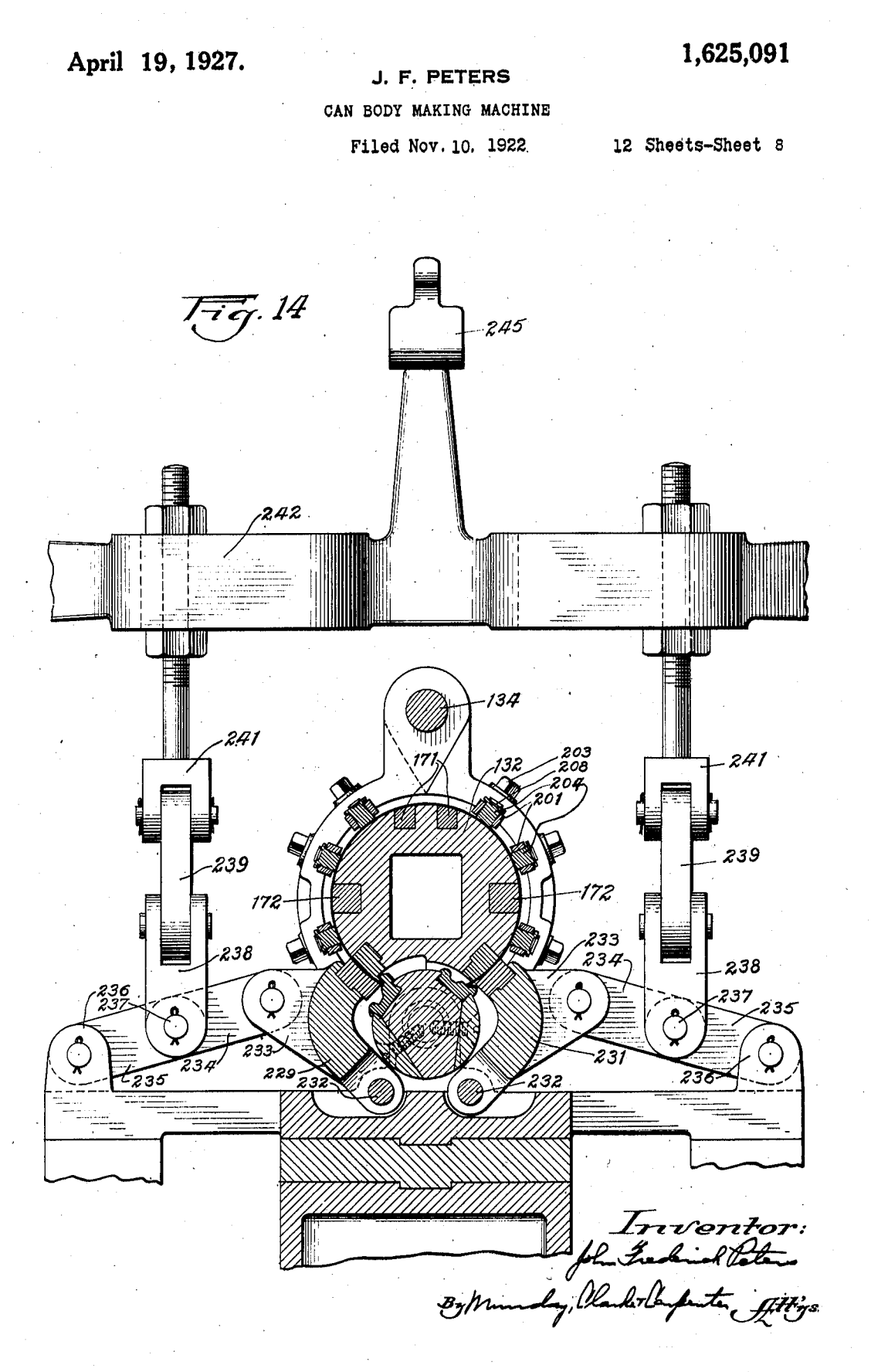

Fig. 14 is a section through the edge bending members;

Figs. 15 and 16 are similar views showing the parts in different relations;

Fig. 17 is a side elevation showing the control for the means clamping the blank at the edging station;

Fig. 18 is a similar view of the control for the mechanism provided to interengage the hooked edges of the blank;

Fig. 19 is an end elevation of the mechanism employed to form the side seam;

Fig. 20 is a section taken substantially on the line 20—20 of Fig. 19;

Fig. 21 is a perspective view of the expanding horn end, the parts being shown separated;

Fig. 22 is a partial vertical sectional view taken longitudinally of the machine and at the side seam forming station on line 22—22 of Fig. 19; and Fig. 23 is a section taken substantially on the line 23—23 of Fig. 22.

The apparatus shown on the drawing, for the purpose of illustrating my present invention, comprises a supporting frame 31, of any preferred construction, adapted to support a bed 32 and overhead arbor 33. The main power shaft 34 is mounted in bearings 35 at the upper end of the arbor 33 and carries idler and driving pulleys 36. A pinion 37 is mounted upon the shaft 34 and meshes with the gear 38 upon a secondary shaft 39 having bearings at 41 and 42 on the arbor 33, the bearing 42, in the present instance, being provided in an extension bracket 45.

The shaft 39 carries a bevel gear 46 which meshes with a bevel gear 47 upon an upright shaft 48. This shaft has bearings 49, in the bracket 45, and 51 in the frame 31. At its lower end, the shaft 48 is provided with a bevel pinion 52 meshing with a bevel pinion 53 on a shaft 54 mounted below the bed 32. The shaft 54 carries a sprocket 55 engaged by a sprocket chain 56, and this chain in turn drives an operating shaft 57 through a sprocket wheel 58.

Figure 1:
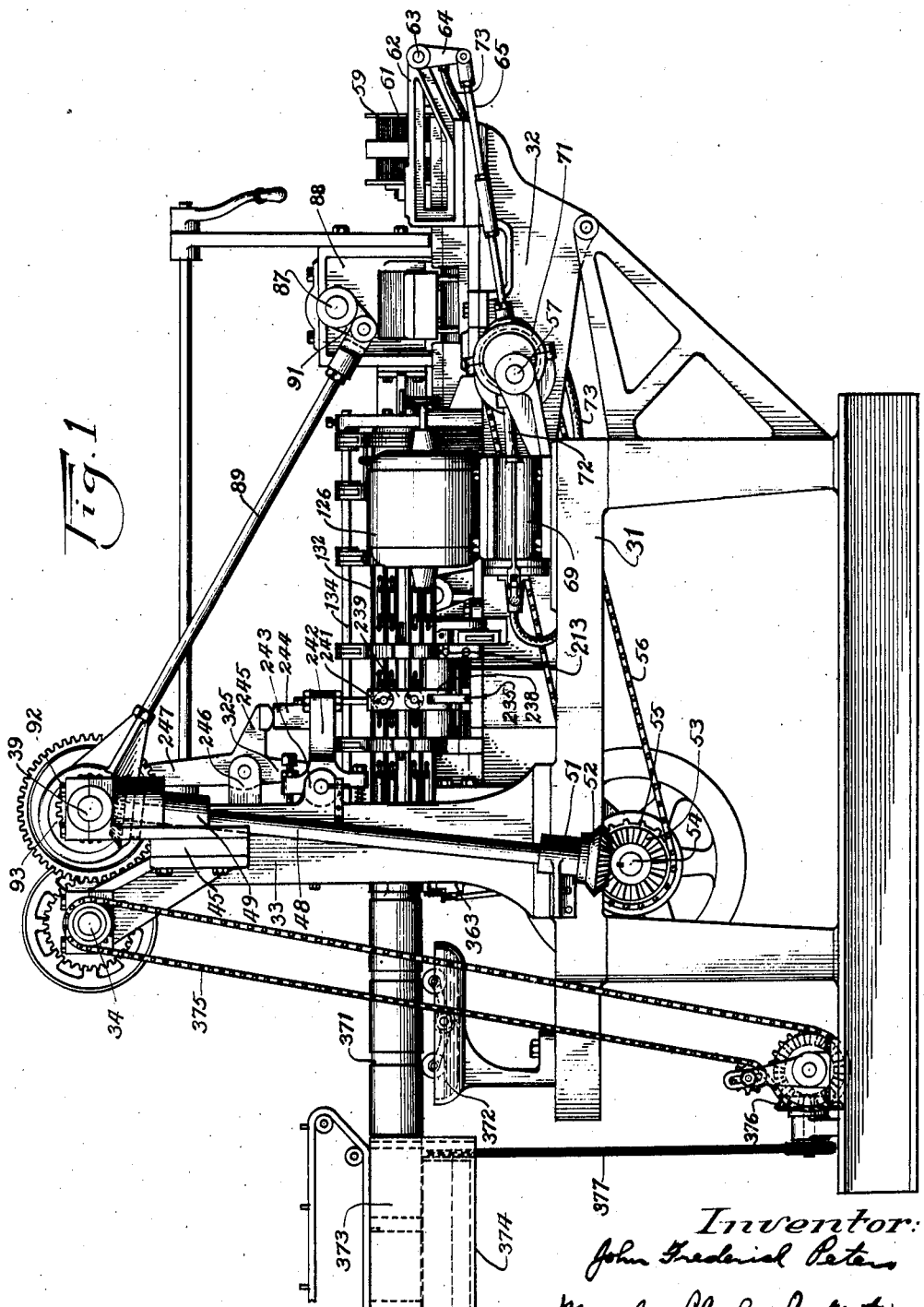
Figure 1 is a side elevation of a machine embodying my present invention.

A stock of body blanks is arranged in stack formation, as indicated at 59 in the stack holder 61 upon the extreme right-hand end of the bed 32 (viewing Fig. 1). A bracket 62 extends rearwardly from the stack and carries an oscillating shaft 63.

This shaft is provided with an arm 64, connected at its free end to a link 65. The link 65 is secured to an eccentric strap 66 of an eccentric on shaft 57, so that rotation of the shaft 57 produces oscillation of shaft 63. Shaft 63 is provided with an arm 67 carrying a vacuum or suction head 68 movable up into engagement with the underside of the stack. This suction head is rendered operative at the moment it engages the lowermost blank of the stack by an exhaust pump 69 operated by an eccentric 71 connected to a piston shaft or stem 72, the exhausting being carried out through a flexible conduit 73. The lowermost blank is pulled down at its center by the suction head and into the path of the blank feed bar 74. This bar is mounted in ways in the frame and carries a plurality of advancing dogs 75 pressed up by springs 76. The feed bar 74 is provided with a downwardly extending arm 77, to which is pivoted a link 78, in turn connected to a lever 79 pivoted or fulcrumed at 81 in the frame. Oscillation is imparted to the lever 79 by a pitman 82 engaging a crank portion 83 of shaft 57.

Figure 3:
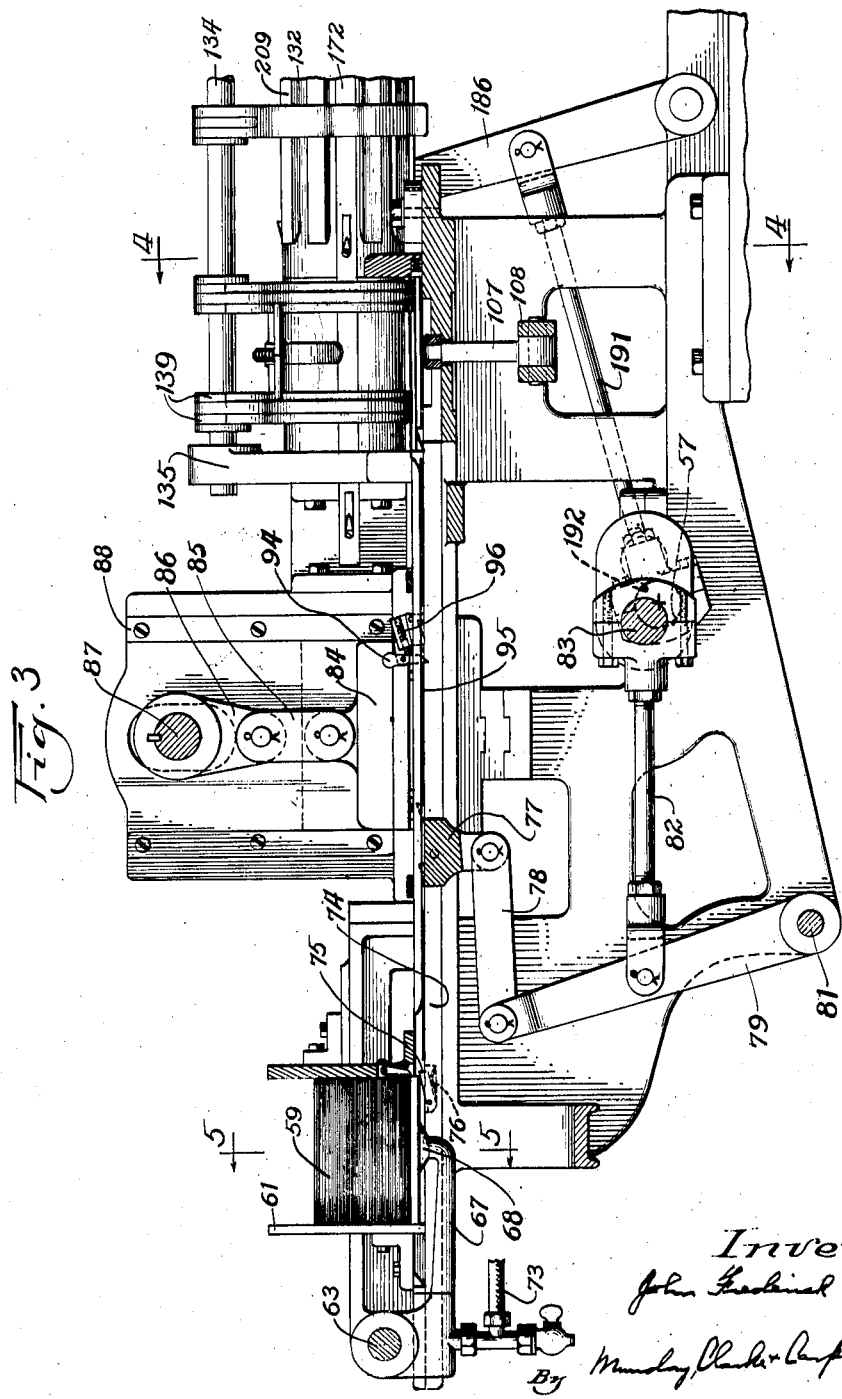
Fig. 3 is an enlarged partial vertical section taken longitudinally of the apparatus.

The feed bar 74 advances the blanks removed from the stack by step-by-step movement past a notching mechanism which is or may be of any usual or preferred construction and which is indicated by reference character 84, in Fig. 3. The notching dies are supported by links 85 connected to arms 86 fast on a cross shaft 87 having bearing in the housings 88 of the notcher. The shaft 87 is caused to oscillate by a pitman 89 engaging an arm 91 on the shaft 87 and an eccentric strap, or sleeve 92 embracing an extension 93 on the shaft 39. Dogs 94 are provided to locate the blanks 95 accurately beneath the notching dies, a spring 96 being associated with each dog to press the blank back against the feed bar dog 75, this spring retracting upon the next forward feeding action of the feed bar to permit the dog 94 to ride up over the blank as it advances.

Figure 4:
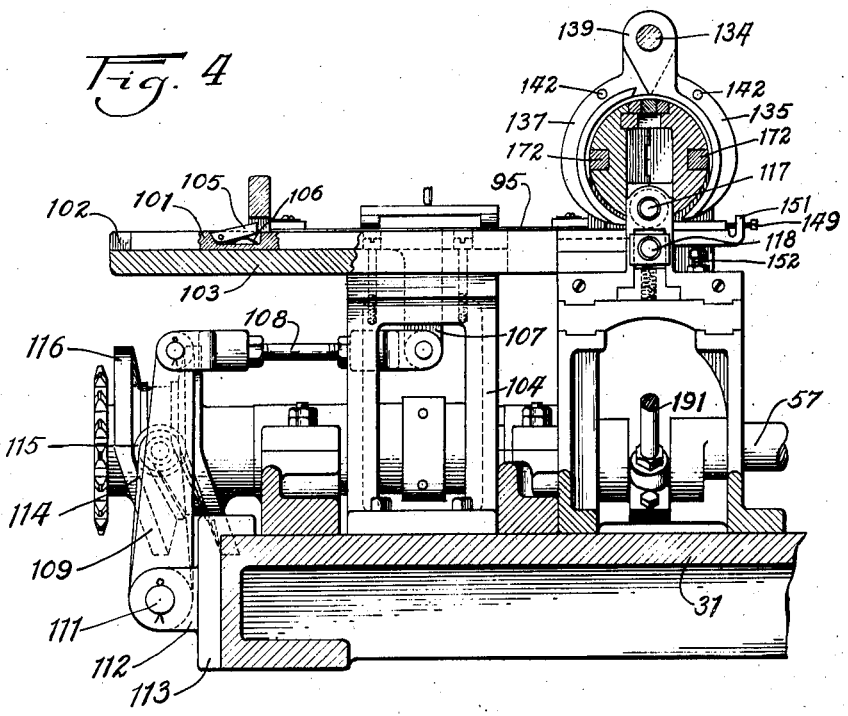
Fig. 4 is a section taken substantially on the line 4—4 of Fig. 3.
Figure 5:
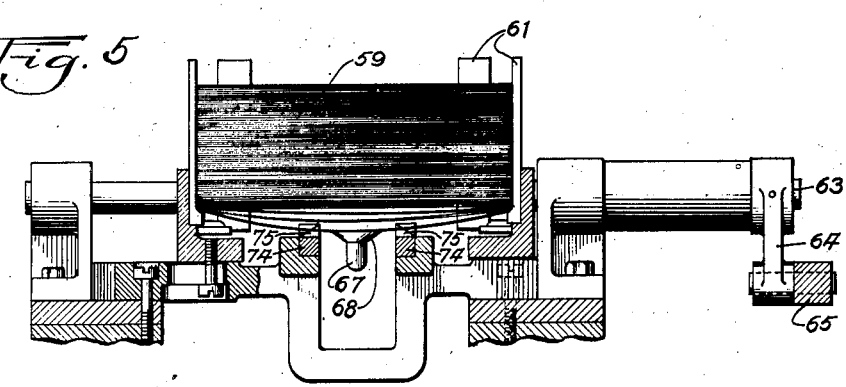
Fig. 5 is a section taken on the line 5—5 in Fig. 3.
Figure 6:
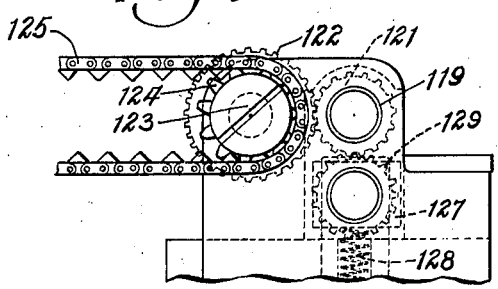
Fig. 6 is a detail of the roll driving mechanism.

In the apparatus shown on the drawing, the blanks are advanced step by step from the notching dies to a position alongside the bending station and are there fed sidewise, i. e., across the machine, to the bending roll which wraps them about the horn by progressive bending of the blank. A second sliding feed bar 101 (Fig. 4) is mounted in ways 102 on a table part 103 supported in a bracket 104 from the frame 31. This feed bar 101 is provided with a blank feed dog 105 held up into feeding position by a spring 106. An arm 107 extends down through the table part 103 and is connected by a link 108 with an arm 109 upon a shaft 111 mounted in bearings 112 of a frame bracket 113. A second arm 114 is also mounted upon shaft 111 and carries a cam roll 115 engaging a cam 116 on shaft 57. Rotation of the shaft 57 causes reciprocation of the feed bar 101 through the mechanism just described and at each movement to the right, viewing Fig. 4, a blank 95 is brought between two rolls 117 and 118 (Figs. 6 and 7). The upper roll 117 has fixed bearing at 119 (Fig. 6) and is provided with a pinion 121 engaging a gear 122 on a stub shaft 123. This stub shaft is provided with a sprocket wheel 124 driven by a sprocket chain 125 from an electric motor 126 (Fig. 2). The lower roll 118 is mounted in bearings 127 supported upon springs 128. The roll 118 is provided with a pinion 129 meshing with the pinion 121.

These rolls 117 and 118 feed the sheet or blank forwardly in its direction of movement and against a bending guide, or beveled member 131. The two rolls and the member 131 progressively bend the blank to substantially its desired curvature. The blank, in leaving the rolls, moves up around and about the horn 132, until its forward edge, or end, engages a hardened stop 133, as indicated in Fig. 7. A rod 134 is mounted in a bracket 135 extending up above the horn at the bending station and in suitable bearings in the arbor 33. Two pairs of wing guides are provided to direct the blank in this movement. A pair of said guides is shown in detail in Fig. 7, from which it will be noted that one, i. e., the one at the forward side in direction of movement of the blank, indicated by 135, may move outwardly against the force of the spring 136 and the other, 137, is held against outward movement by a stop 138. Both wings are mounted upon the shaft, or rod, 134, the bearing for the wing 137 being positioned between two bearings 139 of wing 135. This provides shoulders 141 holding the wings to circular form under the pressure of the spring 136 which is stretched between two pins 142 secured respectively in the two wings. These pins extend between companion members of the two sets of guide wings. The stop 138 is pivoted at 143 and has a flange 144 engaging the outer surface of the wing in substantially a normal relation when a stop pin 145 engages the flange part of the wing. The bending member 131 is slidable upon its support 146, being held in place by set bolts 147 movable in slots 148 of the bending member. Adjustment of the bending member is effected by these set bolts 147 and bolts 149 threaded through upturned arms 151 of the supports 146. Supports 146 are mounted loosely upon the lower roll 118 and are arranged as to height in desired position by set bolts 152, a lock nut 153 being provided on each set bolt 152.

The horn itself is constructed in sections, three sections being provided in the present instance. One said section is located at the bending rolls, the next at and past the edging station and the last, or third section, at the side seaming station. In addition there is a horn extension on past the fluxing and soldering mechanism. The horn section at the bending station will now be described, reference being had more particularly to Figs. 7 and 12. This horn section includes two main body members 161 and 162, that is to say, the horn is divided longitudinally into what may be called two main halves, these being bolted together by bolts 163 and having interfitting shoulders 164 and 165. A portion 166 of horn part 162 is extended over into a recess of companion shape in horn part 161, the purpose of which will be later more fully explained. Two recesses 167 and 168 are provided in the top of the horn body and a recess 169 is provided at each side. These recesses receive feed slides 171 and 172, respectively, the action of which feed slides will hereinafter be more fully explained. The horn body is embraced throughout a large part of its circumference (throughout the length of this section) by replaceable outer shell members 173, 174 and 175, so that wear from the bending action will not affect the entire horn. As has been stated, a hardened member 133 is provided to act as a stop, and a companion hardened member 176 is provided at the other side of the roll 117, these members being held in place by holding blocks 177.

The feed slides 171 and 172 carry dogs 183 like the dogs 75 and 105 and serve to advance the blanks along the horn. A rod, or shaft 181 (Fig. 9) extends through slots 184 in the horn and through an arm 182 fixed between the feed slides 171. This arm extends through a slot 185 in the horn portion 173 already mentioned. Links 178 are also connected with or to the shaft or rod 181 and, in turn, are attached to a lever 186 extending down through the lower part of the horn (Fig. 12). These links move in an opening, or cavity 179 of the horn body. The lever is caused to oscillate, to reciprocate the feed bars, or slides, by a pitman 191 connected to a crank part 192 of shaft 57.

The horn sections are arranged in the end, dowels, or other suitable connections being employed. The intermediate horn section, i. e., the section past the edging station, is provided with side and top slots 193 for the feed slides and is bolted to and supported from the frame by brackets 194 and 195. Throughout the movement of the can body along the horn section just mentioned, the edges of the blank engage bearing plates 196 extending down from the circular part of the horn and held in place by blocks, or bars, 197.

In the present instance, an outside horn is also provided to hold the blank accurately in shape and position as it is intermittently advanced along the horn by the feed slides. Arcuate, or wing brackets 198 and 199 are arranged in pairs and are suspended from rod 134. Each pair of brackets extends about the internal horn and the two members of the pair adjacent the edging station are held against outward swinging, as will be presently more fully described. A plurality of side rails (four in the present instance) are mounted on each side of the horn and extend lengthwise thereof being held in companion brackets of the pairs of bracket members. These rails are indicated by reference character 201 and the detail of their construction and mounting may be observed in Figs. 8 to 11. The brackets are cut away at 202 to receive the rails and are provided with openings for bolts 203 which extend through the brackets into threaded engagement with the rails themselves. The rails are recessed at intervals to receive blocks 204. The body of each block, indicated at 205, extends through the opening or recess 206 in the rail and is provided at its top with laterally extending flanges 207 adapted to bear against the outer face of the rail. Springs 208 are provided to press the blocks 204 inwardly against the can body blank carried on the horn. The ends 209 of the rails adjacent the rolls are cut away, or beveled, at 211 on their inner sides to insure the can body blank entering easily within the outside horn composed of these rails and a rounding or bevel surface 212 is provided on the end of each block to be engaged by the forward edge of the body blank as it is advanced through the apparatus.

The bracket member and the rails carried by them are locked into position by rods 213 slidably and rotatably mounted in brackets 214 and adapted to engage downwardly extending ends 215 of the horn brackets. Each of the rods 213 is provided with a pin 216 adapted to engage behind a stop 217 in or on the bracket 214 through which the rod extends. Finger members 218 are provided to facilitate manipulation of the rod.

The can body blanks are moved along this horn section to the edging station, i. e., the station at which the edges are bent to hook formation preparatory to the interengagement of the edges and their bumping into locked relation. The edging, or bending, mechanism of this station is shown in detail in Figs. 12 to 17. An oscillatable bender, or hook former 219 is mounted in brackets 221, 222 and carries two bending elements or dies 223, 224 adapted to cooperate with blocks 225, 226 of the horn and other blocks 227, 228 of clamping members 229, 231. The clamping members are pivoted at 232 in the table and are provided with lugs 233, each of which is connected by two links 234, 235, with ears, or lugs, 236 on the bed. Said links 234 and 235 are pivoted together at 237 and upon this pivot is connected a vertical link 238 in turn connected with a link 239 pivoted to a downwardly extending pivot-carrying bolt 241 mounted in a cross head, or yoke 242. Referring to Fig. 1, it will be noted that the yoke, or cross head 242 is pivoted in ears 243 on the yoke 33. A post 244 extends up from the yoke 242 and is engaged by a bell-crank arm 245 of a three-armed lever pivoted in ears or lugs 246 carried by the yoke 33. An arm 247 of this lever extends up into engagement with a cam 248 on secondary shaft 39. This construction results in the periodic clamping action of the members 229 and 231 in which action they move against the horn and firmly grasp the can body blank between themselves and blocks 225 and 226 of the horn. Thus clamped, the extreme edges of the blanks extend out for bending into the desired hooked formation. The hooked former dies are provided with initial bending shoulders 251, 252 which, upon rotation in one direction, bend the exposed edges of the blanks, as indicated in Fig. 15. These dies carry also final bending shoulders 253, 254, which, upon rotation in the opposite direction of the bending member, complete the formation of the hook, as shown in Fig. 14. The oscillation of this hook bending member first in the one direction and then in the other is accomplished by a mechanism which will now be described.

An arm 255 is fixed on the end of the bending member and extends down thereneath. It carries a roll 256 engaged within a shoulder block 257 fast on a slide bar 258 adapted to reciprocate in bearings 259 on the frame. This slide bar 258 is connected by a link 261 with a lever 262 pivoted on the frame at 263 and carrying a roll 264 engaging in a cam groove 265 of a cam 266 mounted upon a stub shaft 267 which has bearings at 268 on the frame. This shaft has a sprocket drive 269 from the shaft 57. The cam 266 is so grooved as to oscillate the hook bender first in a clockwise direction, viewing Figs. 14 and 16, and then back in a counter-clockwise direction, both movements occuring in quick sequence and from a midposition, this position being shown in Fig. 16, from which it will be noted that the edges of the blank are first received by the hook-forming member in recesses 271 of the dies 223 and 224.

After the hooks are formed, the can body is moved along by the slide bars onto a last horn section at which the side seam is formed. This horn section is expandible and the expanding is accomplished as an incident to the forming of the seam, the expanding drawing the hooks into tight engagement after they have been interengaged. The construction of this horn section itself is disclosed in detail in Figs. 20 to 23. It consists of a central body part 281 and two side members 282. The body member has a rounded bottom 283 into which is set a mandrel piece 284, against which the actual bumping is accomplished. It is provided at its top with two channel ways 285 for the top feed slide bars, the side feed slide bars not being extended in the present instance into this horn section. The side pieces 282 have rounded outer faces 286 and are provided with flanges 287 adapted to fit into channel recesses 288 in the central body member. Each side member is provided with an aperture 289 and an apertured plate 291 is positioned across the flanges 287 with its aperture 292 in registration with the aperture 289. The material of the body is cut away at 293 to permit the plate 291 to rest against the body member when the horn is contracted. A threaded opening 294 is provided to receive a bolt 295 arranged through the aperture 289 of each side member. Each of these bolts has an enlarged head 296 and a spring 297 is positioned between this bolt head and the companion plate 291 for contracting the horn. The horn is expanded by a central expander 298 mounted in a central bore 299 of the horn body. This expander is provided with two sets of expanding shoulders 301 and 302, located respectively near its ends. These shoulders are beveled and are adapted to engage laterally movable plugs 303 mounted in transverse bores 304, pins 305 being provided to prevent rotation of the plugs in the horn. These plugs engage set screws 306 appropriately arranged in the side members. The expander is held in retracted position by a spring 307 located between an expander shoulder 308 and a shoulder 309 provided in the bore of the head. Referring to Fig. 22, reference character 311 indicates the hammer that closes the seam and the expansion of the horn occurs just prior to the blow. This is accomplished by a post or plate 312 mounted upon the hammer and in a way 313. The expander has a beveled head 314 adapted to be engaged by the beveled end 315 of the plate 312 to move the expander in its expanding action and it will be noted that this expanding occurs late in the stroke of the hammer.

The outer horn terminates short of the expandible horn section and means are provided for clamping the can body in position. These means include a clamp at the top of the horn and successively acting side clamps, which, as an incident to their action, cause the hooked edges of the body to interengage. A bracket 316 is mounted in a cross member 317 of the overhead yoke or frame structure 33. This bracket is provided with a vertical recess, or pocket, 318, in which rests a clamping member 319 normally resting on the horn and having a bevel end 321 at the feeding in side. An aperture 322 extends through the bracket 316 and the yoke or frame part 317 and in this aperture is slidably mounted a rod or block 323. The ends of the clamping member 319 and the rod 323 are mutually beveled at 324, so that when the rod is moved to the left, viewing Fig. 22, the clamping member will be forced down upon a can body blank on the horn, clamping it tightly thereagainst. This movement is given the rod by an arm 325 of the three-part lever already mentioned as having arms 245 and 247 (Figs. 1 and 17). The two side clamps are indicated in Fig. 19 by reference character 326 and 327. The clamp 326 is first moved in to cause the can body blank half having the inside hook to contact closely about the contracted horn and the clamp 327 then comes in from the other side to produce the same result with the other half of the blank. Since the horn is contracted, the hooks are thus brought in overlying relation and upon expansion of the horn, become interengaged.

The clamps at the two sides are substantially alike and a description of one of them will apply to the other. The left-hand clamp is shown in detail in Figs. 19 and 20. The frame of the apparatus, or rather the yoke part 33 thereof, is provided with a way, or slot, 328 at the side of the horn and in this is mounted a slide member 329. This slide member carries a socket projection 331 entering into a recess 332 of the stem 333 of the clamp. A spring 334 is positioned in the socket projection 331 and bears against the bottom of the recess 332 and tends to separate the stem 333 and slide member 329. This separating action is limited by a plug 335 on the socket projection entering into a slot 336 in the stem 333. The stem carries an arcuate head 337, the outer surface of which is shaped to conform to the horn. This head is recessed transversely of its direction of movement and carries in the recess indicated by reference character 338, a yielding bar 339. This bar is provided with two rearward extending studs, or bolts, 341, which extend back through the head and are embraced by springs 342 positioned between the head and bar. The outer face of the bar is curved to conform to the horn and the bar engages the body blank ahead of the clamping head proper. This engagement occurs near the top of the horn, so that there is a wrapping action provided by the successive engagements of the parts. The clamping heads are moved into position by mechanism which will now be described. A cam 343 (Figs. 18 and 19) for each head, or clamping member, is mounted on shaft 54 and this cam is engaged by a roll 344 mounted upon a link 345 embracing the shaft 54 and connected to a side rod 346 having bearing at 347 in the frame yoke 33. A bell-crank lever 348 has bearing at 349 in a bracket 351 on the frame and is connected to the slide rod 346 by a link 352. This lever is also connected by a link 353 with a slide block 329; a pin 354 engaging the link and passing through a slot 355 accomplishing this connection.

When the can body blank is advanced to the seaming station, the hooked edges are engaged with recessed members 356 carried by levers 357 pivoted at 358. Each of these levers is swung down by a cam 359 mounted upon the shaft or pivot 349, said cam 359 being movable with the bell-cranks 348 to release the hooked edges of the body blank successively. A spring 361 causes the levers to follow the cam.

The bumper, or hammer, is perhaps best illustrated in Figs. 19 and 22. It consists of a hardened hammer head 362 mounted in a holder 363 which is slidable vertically in ways formed by guides 364. The hammer is operated by a crank 365 formed in shaft 54 and through a pitman 366. A mechanism for causing accurate registration of the hook is shown in Fig. 22 at 367, but this will not be described in detail here, since it forms the subject matter of a separate application.

From the side seam forming station, the formed body passes off onto a horn extension 371 past a fluxing mechanism 372 and a soldering mechanism 373, which will not be described in detail, it being sufficient to mention that the solder roll 374 is actuated from shaft 34 by sprocket chain 375, bevel gear 376 and sprocket chain 377.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A machine for making can bodies, comprising a forming horn, means for arranging body blanks in horizontal position adjacent said horn, feed rolls mounted beneath the horn and in position to receive an end of the blank, means moving the blank to the under side of the horn and between said rolls, and a guide or bending member against which the blank is progressively forced to bend it to the shape of the horn.

2. A machine for forming can bodies, comprising in combination a forming horn, roll therebeneath, means for feeding a blank endwise to the under side of the horn and between said rolls, and a member positioned adjacent said roll and contacting with the passing blank to progressively bend the same, said member being vartically adjustable.

3. A machine for forming can bodies, comprising in combination a forming horn, rolls therebeneath, means for feeding a blank endwise at the under side of the horn and between said rolls, and a member positioned adjacent said roll and contacting with the passing blank to progressively bend the same, said member being adjustable toward and from said rolls.

4. A machine for forming can bodies, comprising in combination a forming horn, means progressively bending the blank and feeding it first to the under side of said horn, and means forming with said horn a pass for directing the blank about said horn, said means being yieldable away from the horn.

5. A machine for forming can bodies, comprising in combination a forming horn, means progressively bending the blank as it is fed to said horn, and means forming with said horn a pass for directing the blank about said horn, said means being yieldable at the entrance side of said pass.

6. A machine for forming can bodies, comprising a forming horn, means progressively bending the body blank to desired curvature at the same time feeding the same to wrap itself about said horn, external members forming a pass with said horn for said blank, and means for yieldingly pressing the front edge of the curling blank inwards towards the central horn before it reaches its final position.

7. A machine for making can bodies, comprising in combination a horn, means for progressively bending a can body and feeding it forward to permit it to wrap itself about said horn, means feeding said bent body along said horn, and means yieldingly pressing said body against said horn as it is fed therealong.

8. A machine for making can bodies, comprising in combination a horn, means for progressively bending a can body and feeding it forward to permit it to wrap itself about said horn, means for feeding the bent body along said horn, and an outside horn confining the body to the inside horn as it is fed therealong and forming an annular pass for the body blank around the sides and top of the horn.

9. A machine for forming can bodies, comprising a horn about which the body blank may be wrapped, means for feeding the wrapped body blank along the horn, and an outside horn for confining the body blank to the inside horn, said outside horn comprising two halves pivoted above the horn and means retaining said halves in position.

10. A machine for forming can bodies, comprising a horn about which the body blank may be wrapped, means for feeding the wrapped body blank along the horn, and an outside horn for confining the body blank to the inside horn, said outside horn being rigidly fixed in position and having yielding elements engaging the body blanks as they pass between it and the inside horn.

11. A machine for forming can bodies, comprising in combination a horn about which the body may be wrapped, means at the under side of the horn for forming hooks in the edges after the same are wrapped about said body, said means including levers mounted adjacent the horn and adapted to clamp a blank near its edges against said horn, and means actuating said levers, said means including links applying pressure to said levers by a toggle action.

12. A machine for making can bodies, comprising a forming horn, feed rolls for arranging body blanks upon said horn, automatically operable means for feeding the blanks endwise between said rolls at the under side of the horn, and means for automatically delivering the blanks from a stack to said last-mentioned feeding means.

13. A machine for making can bodies having in combination a forming horn, a holder for blanks arranged at one side of the vertical plane of the axis of the horn, mechanism for moving the bent blanks along the horn, automatic blank feeding means reciprocating towards and from the side of the horn, means for curling the blanks around the horn, and actuating means for operating said blank-moving mechanism and said reciprocating means in timed relation.

14. A machine for making can bodies, comprising a forming horn, a holder for a stack of blanks, and wholly automatic means for feeding blanks individually from the stack to a position adjacent said horn at the under side thereof, in combination with feed rolls for arranging the blanks upon the horn.

15. A machine for making can bodies, comprising a forming horn, a holder for a stack of blanks, and wholly automatic means for feeding blanks individually from the stack to a position adjacent the under side of said horn, in combination with separately driven feed rolls for arranging the blanks upon the horn.

16. In a machine for making can bodies, the combination of a forming horn having a recess in its under side, a blank feeding roll located in said recess, a blank feeding roll located below the first mentioned roll and cooperating therewith, feeding means acting horizontally near the level of the bottom of the horn, and means exterior to said horn to guide the body blank as it is curled and fed around the sides and top part of the horn.

17. In a machine for making can bodies, the combination of a forming horn having a recess in its under side, a blank feeding roll located in said recess, a blank feeding roll located below the first mentioned roll and cooperating therewith, means exterior to said horn to guide the body blank as it is curled and fed around the sides and top part of the horn, means for feeding a body blank to said rolls, and power means for actuating the movable parts of the machine, excepting said rolls, and an electric motor for driving said blank feeding rolls at high speed.

18. In a machine for making can bodies, the combination of a forming horn having a recess in its under side, a blank feeding roll located in said recess, a blank feeding roll located below the first mentioned roll and co-operating therewith, feeding means acting horizontally near the level of the bottom of the horn, means exterior to said horn to guide the body blank as it is curled and fed around the sides and top part of the horn, and means exterior to the horn whereby there is formed a complete annular pass around the two sides and top of said horn for the blank as it is being fed and curled by said rolls.

19. In a can body machine, the combination of a horn, body-feeding slide bars for causing the can bodies to progress along the horn, said slide bars having means to engage and advance said can bodies and being mounted in guiding recesses in the periphery of the horn, means for advancing and retracting said slide bars, and an outside horn extending longitudinally and around said advancing means.

20. In a can body machine, the combination of a horn having therealong successive stations for the can body, the horn at one of said stations being contractable and expansible radially, and means for expanding the horn to true cylindrical form.

21. In a can body machine, the combination of a horn, heads arranged at the sides of the horn for operating successively on the outwardly edged and the inwardly edged sides of the can body, and means including yielding devices for giving said heads movements towards the horn in substantially right lines.

22. In a can body machine, the combination of a horn, heads arranged at the sides of the horn for operating successively on the outwardly edged and the inwardly edged sides of the can body, and means for giving said heads movements towards the horn in substantially right lines, said heads having yielding means for engaging said sides of the can body.

23. In a can body machine, the combination of a horn which is contractible and expansible radially, means for changing the size of the horn, means for bumping the interlocked edges of the can body, and means for interlocking said edges comprising devices for engaging said edges and holding them away from the horn, and devices for successively pressing the outwardly edged and the inwardly edged sides of the can body away from said holding devices and towards the horn into position to be interlocked by the expansion of the horn.

24. In a can body machine, the combination of a horn which is contractible and expansible radially, means for contracting and expanding the horn, means for bumping the interlocked edges of the can body, and heads arranged at the sides of the horn for successively pressing inward the outwardly edged and the inwardly edged sides of the can body, and means for moving said heads towards the horn in substantially right lines.

25. In a can body machine, the combination of a horn, devices for positively holding the hooked edges of the can body away from the horn, heads arranged at the sides of the horn for successively pressing the outwardly edged and the inwardly edged sides of the can body towards the horn, and means for moving said heads towards the horn on substantially right lines.

26. In a can body machine, the combination of a horn, devices engaging the hooked edges of the can body for holding them away from the horn, heads at the sides of the horn movable in right lines to press the outwardly edged and inwardly edged sides of the can body towards the horn, and means for cooperatively moving said devices and heads to bring the hooked edges of the can body into position to be interlocked.

27. The combination of a horn having edging elements, and an edging device mounted and rocking on a central pivot and having edging elements cooperating with those on the horn to form the can body with outwardly and inwardly turned hooks adapted to be interlocked with each other, said edging device being arranged between said pivot and the horn.

28. A machine for making can bodies, comprising means for feeding the blanks, a horn upon which the bodies are formed, means including feeding rolls located below said horn for wrapping the blanks about said horn, and means for connecting the ends of said blanks to form continuous bodies.

29. A machine for making can bodies, comprising means for feeding the blanks, a horn upon which the bodies are formed, means including cooperating rollers located below said horn for wrapping the blanks about said horn, and means for causing interengagement of the edges of said blanks to form continuous bodies.

30. A machine for making can bodies, comprising means for feeding the blanks, a horn upon which the bodies are formed, means including cooperating rollers located below said horn for wrapping the blanks about said horn, means for forming hooked edges on said blanks, and means for causing interengagement and locking of said edges to form continuous bodies.

31. A machine for making can bodies, comprising a forming horn, automatic mechanism for feeding body blanks to horizontal postion adjacent said horn, related means for moving said blanks from said position toward said horn, means for notching said blanks and separate and continuously operated rolls under the horn for arranging said blanks in operative position upon said horn.

32. A machine for making can bodies, comprising a forming horn, automatic mechanism for feeding body blanks to horizontal position adjacent said horn, co-acting means for moving said blanks from said position toward said horn, and separate and continuously operated mechanism for arranging said blanks in operative position upon said horn, said mechanism comprising cooperating rollers located below said horn for moving the blanks and guiding means directing said blanks around said horn.

33. A machine for making can bodies, comprising means for feeding the blanks, a horn upon which the bodies are formed, means including cooperating rollers located below said horn and guiding means extending around said horn for positioning the blanks in operative position upon the horn, and means for locking the edges of said blanks in a seam.

34. A machine for making can bodies, comprising a body blank stack holder, automatic means for individually removing blanks from said holder and for advancing them to a predetermined position, means acting in the path of said blanks for notching the latter, a forming horn, means for moving the blanks from said predetermined position toward said horn, means including cooperating rollers for arranging the blanks in operative position upon said horn, means acting in conjunction with said horn for forming hooked edges on said blanks, and means, also acting in conjunction with the horn, for locking said edges in a side seam.

35. A machine for making can bodies, comprising a body blank stack holder, automatic means for individually removing blanks from said holder and for advancing them to a predetermined position, means acting in the path of said blanks for notching the latter, a forming horn, means for moving the blanks from said predetermined position toward said horn, means including co-operating rollers for arranging the blanks in operative position upon said horn, means acting in conjunction with said horn for forming hooked edges on said blanks, means, also acting in conjunction with the horn for locking said edges in a side seam, and clamping means for holding the blanks upon the horn at the operating stations.

36. A machine for making can bodies, comprising a forming horn, roller means for wrapping the blanks around said horn, an independent prime motor for said roller means, rocker cams for oppositely hooking the edges of said blanks, and means for locking said hooked edges in a side seam.

37. A machine for making can bodies, comprising a forming horn, means for arranging body blanks around said horn, reciprocating means for intermittently advancing the blanks upon the horn, a single rocker arranged under the horn and parallel therewith rockable sidewise relative to the horn and having cams cooperating with said horn to form oppositely hooked edges on said blanks, means for causing interengagement of said hooked edges, and means for compressing said edges to form a lock seam.

38. A machine for making can bodies, comprising a forming horn, means for arranging body blanks around said horn, reciprocating means for intermittently advancing the blanks upon the horn, rocker cams arranged under the horn and rockable sidewise relative thereto and cooperating on alternate rocking movements with said horn to form oppositely hooked edges on said blanks, means for causing interengagement of said hooked edges, and a power controlled hammer for compressing said edges to form a lock seam.

39. A machine for making can bodies, comprising a forming horn, means for automatically wrapping blanks around said horn comprising rollers and an independent electric motor therefor, means cooperating with said horn for locking the edges of said blanks in the side seam, and separate cam controlled clamping devices for clamping the blanks to the horn at successive operating stations.

40. A machine for making can bodies, comprising a forming horn, means for automatically wrapping blanks around said horn comprising rollers and an independent electric motor therefor, means cooperating with said horn for locking the edges of said blanks in the side seam, separate clamping devices for pressing the blanks against the horn at successive operating stations, and common operating means for said devices.

41. A machine for making can bodies, comprising a forming horn, means for automatically wrapping blanks around said horn comprising rollers and an independent electric motor therefor, means cooperating with said horn for locking the edges of said blanks in the side seam, separate clamping devices for pressing the blanks against the horn at successive operating stations, common operating means for said devices, and a wedge cam controlled by said operating means for actuating one of said devices.

42. A machine for making can bodies, comprising automatic blank feeding mechanism, a forming horn, roller means for positioning the blanks upon said horn, an electric motor for said roller means independent of said feeding mechanism, and means cooperating with said horn for locking the edges of said blanks in a side seam.

43. A machine for making can bodies, comprising a forming horn, means for positioning blanks upon said horn, means for advancing the blanks thereon, a rocker arranged under the horn and parallel therewith and having sidewise movement relative to the horn for crimping the edges of said blanks comprising the edge of a blank-enclosing element and an edge of said horn to form oppositely arranged hooked flanges thereon, means engaging said flanges beyond the crimping station, said means successively releasing said flanges to permit interengagement thereof, and means for locking said interengaged flanges in a side seam.

44. A machine for making can bodies, comprising a forming horn comprising rollers and a separate electric motor therefor, means for positioning blanks upon said horn, means for advancing the blanks thereon, means for crimping the edges of said blanks to form oppositely arranged hooked flanges thereon, means engaging said flanges beyond the crimping station, said means successively releasing said flanges to permit interengagement thereof, clamping means for compressing the blanks about said horn after release of said edges, and means for clamping said edges in a side seam.

45. A machine for making can bodies, comprising a forming horn, means for positioning blanks upon said horn, means for advancing the blanks thereon, a rocker arranged centrally under the horn and parallel therewith and having sidewise movement relative to the horn and operating alternately on the two edges of the blanks for crimping the edges of said blanks to form oppositely arranged hooked flanges thereon, means engaging said flanges beyond the crimping station, said means successively releasing said flanges to permit interengagement thereof, and means for clamping said interengaged flanges in a side seam, said horn having a reduced portion at the clamping station and said flange-engaging means holding the flanges away from said portion prior to said releasing action.

46. In a can body making machine the combination of a horn, blank-feeding and bending means and edging means cooperating to form can bodies around said horn, notching means arranged at the side of the horn and operating preliminarily on said blanks, and mechanism actuating said instrumentalities in timed relation.

47. In a can body making machine the combination of a horn, blank-feeding and bending means and edging means cooperating to form can bodies around said horn, said feeding means comprising rollers for curling the blanks around the horn, notching means arranged at the side of the horn and operating preliminarily on said blanks, and mechanism actuating said instrumentalities in timed relation.

48. In a can body making machine the combination of a horn, means for forming can bodies thereon, a single stack holder for body-blanks, a blank-notching means operating on said blanks on their passage from said holder to said horn, blank-feeding means for transferring the blanks from said holder to said notching means and thence to the horn, means for forming said blanks into can bodies on said horn, and mechanism actuating said instrumentalities in timed relation.

49. In a can body making machine the combination of a horn, a single stack holder for body-blanks, a blank-notching means operating on said blanks on their passage from said holder to said horn, blank-feeding means for transferring the blanks from said holder to said notching means and thence to the horn comprising rollers for curling the blanks around the horn, means for forming said blanks into can bodies on said horn, and mechanism actuating said instrumentalities in timed relation.

50. In a can body making machine the combination of a horn, blank-feeding and bending means and edging means cooperating to form can bodies around said horn, said feeding means comprising rollers for curling the blanks around the horn and an independent electric motor for actuating said rollers, and mechanism actuating said instrumentalities in timed relation.

51. In a can body making machine the combination of a horn, blank-feeding and bending means and edging means cooperating to form can bodies around said horn, said feeding means comprising rollers for curling the blanks around the horn and an independent electric motor for actuating said rollers, notching means operating preliminarily on said blanks, and mechanism actuating said instrumentalities in timed relation.

52. In a can body making machine the combination of a horn, means for holding a body-blank curled around the same, and an oscillating hook-former turning on an axis parallel with the horn and having a pair of projections for bending one edge of the blank inward and the other edge of the blank outward at one motion and having another pair of projections acting on the reverse movement of said hook-former to further bend the first edge of the blank outward and the second edge of the blank inward, to form inside and outside hooks.

53. In a can body making machine the combination of a horn, rollers for curling a body-blank around the horn, means for holding a body-blank curled around the same, and an oscillating hook-former turning on an axis parallel with the horn and having a pair of projections for bending one edge of the blank inward and the other edge of the blank outward at one motion and having another pair of projections acting on the reverse movement of said hook-former to further bend the first edge of the blank outward and the second edge of the blank inward, to form inside and outside hooks.

54. In a can body making machine the combination of blank-curling and feeding rollers, a horn around which the blank is curled by said rollers, a wing near the horn confining the curled blank and having an edge around which an edge of the blank is bent outward to form a hook, said horn having a corresponding edge around which the other edge of the blank is bent inward to form an opposite hook, and an edging member oscillating between and cooperating with said edges of the wing and horn to bend said hooks.

55. In a can body making machine the combination of blank-curling and feeding rollers, an independent motor for actuating said rollers continuously, a horn around which the blank is curled by said rollers, a wing near the horn confining the curled blank and having an edge around which an edge of the blank is bent outward to form a hook, said horn having a corresponding edge around which the other edge of the blank is bent inward to form an opposite hook, and an edging member oscillating between and cooperating with said edges of the wing and horn to bend said hooks.

JOHN F. PETERS